United States Patent
Narasimhan (10) Patent No.: US 7,606,316 B1
(45) Date of Patent: Oct. 20, 2009

(54) MIMO-OFDM PREAMBLE FOR CHANNEL ESTIMATION

(75) Inventor: Ravi Narasimhan, Los Altos, CA (US)

(73) Assignee: Marvell International Ltd., Hamilton (BM)

(*) Notice: Subject to any disclaimer, the term of this patent is extended or adjusted under 35 U.S.C. 154(b) by 1092 days.

(21) Appl. No.: 10/693,566

(22) Filed: Oct. 23, 2003

Related U.S. Application Data (60) Provisional application No. 60/470,832, filed on May 14, 2003.

(51) Int. Cl.
H04L 27/28 (2006.01)

(52) U.S. Cl. ..................................... 375/260

(58) Field of Classification Search ................ 375/260, 375/299, 347, 267, 130, 219; 455/562; 370/208, 370/209
See application file for complete search history.

(56) References Cited

U.S. PATENT DOCUMENTS

| | | | |
|---|---|---|---|
| 6,473,467 B1 | 10/2002 | Wallace et al. | |
| 7,088,782 B2* | 8/2006 | Mody et al. | 375/260 |
| 2002/0041635 A1 | 4/2002 | Ma et al. | |
| 2002/0122381 A1 | 9/2002 | Wu et al. | |
| 2002/0181390 A1 | 12/2002 | Mody et al. | |
| 2003/0016621 A1* | 1/2003 | Li | 370/203 |
| 2003/0021332 A1* | 1/2003 | Li | 375/147 |
| 2003/0072254 A1 | 4/2003 | Ma et al. | |
| 2003/0072255 A1 | 4/2003 | Ma et al. | |
| 2003/0072452 A1 | 4/2003 | Mody et al. | |
| 2004/0190636 A1* | 9/2004 | Oprea | 375/260 |

OTHER PUBLICATIONS

"Part 16: Air Interface for Fixed Broadband Wireless Access Systems", IEEE Standard 802.16 (Oct. 2004); pp. 1-857.
"802.16 IEEE Standard for Local and Metropolitan Area Networks; Part 16: Air Interface for Fixed Broadband Wireless Access Systems," 802.16 IEEE Standard for Local and Metropolitan Area Networks, Oct. 1, 2004, pp. i-xxxiv and pp. 1-857, IEEE Std 802.16-2004, IEEE, United States.
"Part 11: Wireless LAN Medium Access Control (MAC) and Physical Layer (PHY) Specifications," Telecommunications and Information Exchange Between Systems—Local and Metropolitan Area Networks—Specific Requirements, IEEE 802.11, ISO/IEC 8802-11 Aug. 20, 1999.
"Part 11: Wireless LAN Medium Access Control (MAC) and Physical Layer (PHY) specifications: High-speed Physical Layer in the 5 GHZ Band," IEEE 802.11a, Supplement to IEEE Standard for Information Technology—Telecommunications and Information Exchange Between Systems—Local and Metropolitan Area Networks—Specific Requirements, Sep. 16, 1999.
"Part 11: Wireless LAN Medium Access Control (MAC) and Physical Layer (PHY) Specifications: High-speed Physical Layer Extension in the 2.4 GHz Band," IEEE 802.11b, Supplement to IEEE Standard for Information Technology—Telecommunications and Information Exchange Between Systems—Local and Metropolitan Area Networks—Specific Requirements, Sep. 16, 1999.

(Continued)

Primary Examiner—Khai Tran (57) ABSTRACT

A preamble for a MIMO-OFDM system includes multiple training symbols. Each training symbol has a pattern in which data symbols and null symbols are transmitted on all tones and on all transmit antennas. The pattern for each training symbol corresponds to a cyclic shift of the patterns of the other training symbols.

82 Claims, 4 Drawing Sheets

OTHER PUBLICATIONS

"*Part 11: Wireless LAN Medium Access Control (MAC) and Physical Layer (PHY) specifications: Further Higher Data Rate Extension in the 2.4 GHz Band*," IEEE 802.11g/D8.2, DRAFT Supplement to IEEE Standard for Information Technology—Telecommunications and Information Exchange Between Systems—Local and Metropolitan Area Networks—Specific Requirements, Apr. 2003.

"*Wireless LANs—TGn Sync Proposal Technical Specification: Syed Aon Mujtaba*," IEEE 802.11n-04/0889r6, May 18, 2005.

\* cited by examiner

MIMO-OFDM Preamble for 3 Transmitters (Symbol L1)
Subcarrier (DC omitted)

|      | -26 | -25 | -24 | -23 | -22 | -21 | ... | 24  | 25  | 26  |
|------|-----|-----|-----|-----|-----|-----|-----|-----|-----|-----|
| Tx 1 | A1  | 0   | 0   | A2  | 0   | 0   | ... | 0   | 0   | A18 |
| Tx 2 | 0   | B1  | 0   | 0   | B2  | 0   | ... | B17 | 0   | 0   |
| Tx 3 | 0   | 0   | C1  | 0   | 0   | C2  | ... | 0   | C17 | 0   |

*FIG. 4*

MIMO-OFDM Preamble (Symbol L2)
Subcarrier (DC omitted)

|      | -26 | -25 | -24 | -23 | -22 | -21 | ... | 24  | 25  | 26  |
|------|-----|-----|-----|-----|-----|-----|-----|-----|-----|-----|
| Tx 1 | 0   | 0   | C1  | 0   | 0   | C2  | ... | 0   | C17 | 0   |
| Tx 2 | A1  | 0   | 0   | A2  | 0   | 0   | ... | 0   | 0   | A18 |
| Tx 3 | 0   | B1  | 0   | 0   | B2  | 0   | ... | B17 | 0   | 0   |

*FIG. 5*

MIMO-OFDM Preamble (Symbol L3)
Subcarrier (DC omitted)

|      | -26 | -25 | -24 | -23 | -22 | -21 | ... | 24  | 25  | 26  |
|------|-----|-----|-----|-----|-----|-----|-----|-----|-----|-----|
| Tx 1 | 0   | B1  | 0   | 0   | B2  | 0   | ... | B17 | 0   | 0   |
| Tx 2 | 0   | 0   | C1  | 0   | 0   | C2  | ... | 0   | C17 | 0   |
| Tx 3 | A1  | 0   | 0   | A2  | 0   | 0   | ... | 0   | 0   | A18 |

|      | -26 | -25 | -24 | -23 | ... | 24  | 25  | 26  |
|------|-----|-----|-----|-----|-----|-----|-----|-----|
| Tx 1 | A1  | A2  | A3  | 0   | ... | 0   | 0   | 0   |
| Tx 2 | 0   | 0   | 0   | B1  | ... | B17 | 0   | 0   |
| Tx 3 | 0   | 0   | 0   | 0   | ... | 0   | C16 | C17 |

FIG. 9

MIMO-OFDM PREAMBLE FOR CHANNEL ESTIMATION

CROSS-REFERENCE TO RELATED APPLICATIONS

This application claims priority to U.S. Provisional Application Ser. No. 60/470,832, filed on May 14, 2003 and entitled "A MIMO-OFDM PREAMBLE FOR CHANNEL ESTIMATION".

BACKGROUND

Wireless phones, laptops, PDAs, base stations, and other systems may wirelessly transmit and receive data. A single-in-single-out (SISO) system may have two transceivers in which one predominantly transmits and the other predominantly receives. The transceivers may use multiple data rates and may select from these rates based on channel quality.

Figure 1:
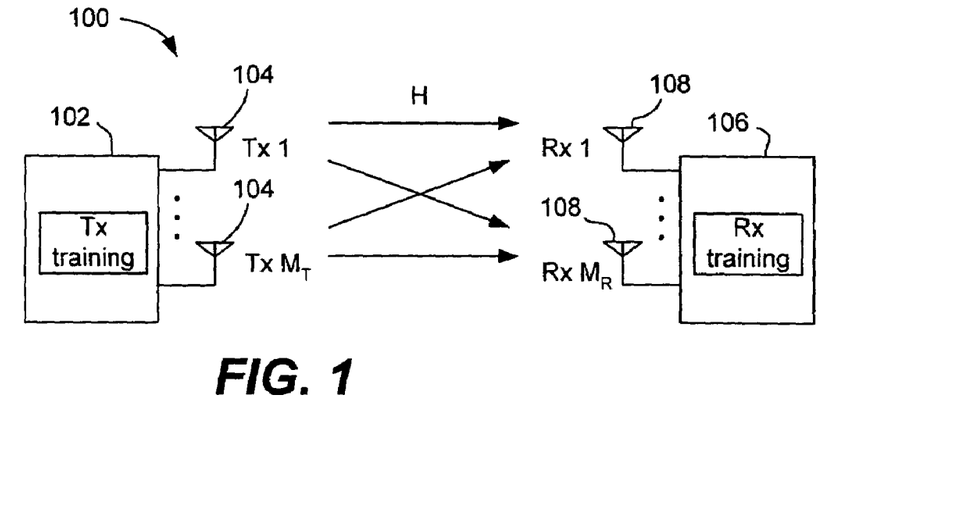
FIG. 1 is a block diagram of a wireless multiple-in-multiple-out (MIMO) communication system.

A multi-antenna system, such as an $M_R \times M_T$ multiple-in-multiple-out (MIMO) wireless system 100, such as that shown in FIG. 1, uses $M_T$ transmit antennas 104 at a first transceiver 102 and $M_R$ receive antennas 108 at a second transceiver 106. The first and second transceivers 102 and 106 in FIG. 1 are designated "transmitter" and "receiver", respectively, for the purposes of illustration, but both transceivers 102 and 106 may transmit and receive data.

The multiple antennas may enable the MIMO system to improve link quality (e.g., achieve a minimum bit error rate (BER)) and/or achieve high data rates. The MIMO system may improve link quality by using a transmission signaling scheme called "transmit diversity," where the same data stream is sent on multiple transmit antennas 104, creating redundancies that may be used by the receiver 106 to obtain an estimate of the received data. The MIMO system may achieve high data rates by using a transmission signaling scheme called "spatial multiplexing," where a data bit stream may be demultiplexed into parallel independent data streams. The independent data streams are sent on different transmit antennas 104 to obtain an increase in data rate corresponding to the number of transmit antennas 104 used. The MIMO system may use a combination of these two techniques to achieve at least some of the benefits of both techniques.

SISO and MIMO systems may use channel estimation techniques to determine the quality of the channel(s) over which data is being exchanged in the wireless system. The transmitter may transmit training sequences, which include symbols known to the receiver, for channel estimation. For a MIMO system, channels between all pairs of the transmit ($T_x$) and receive antennas ($R_x$) should be estimated. This may require extra training overhead.

SUMMARY

A wireless system, such as an N×N MIMO-OFDM system may include a transceiver with N antennas and a transmit training module and a transceiver with N antennas and a receive training module. The transmit training module may generate a preamble structure including one or more training symbols. Each training symbol includes a number of data symbols, each data symbol corresponding to a particular tone. Each training symbol has a pattern in which data symbols and null symbols are transmitted on all tones and on all transmit antennas. The pattern for each training symbol corresponds to a cyclic shift of the patterns of the other training symbols.

The receive training module uses the received preamble to determine the gain at each antenna for each tone. In an embodiment, the receive training module may receive a preamble including only one training symbol and, for each antenna, interpolate the values for tones on which null symbols are transmitted from the data symbols received on that antenna. In another embodiment, the receive training module may receive a preamble including N training symbols (one for each transmit antenna). When all training symbols are received, the receive training module will have received each data symbol on the corresponding tone from each of the antennas. For each antenna, the receive training module may determine the gain at each antenna for each tone by performing an inverse Fourier transform on the data symbols received on that antenna.

DETAILED DESCRIPTION

FIG. 1 illustrates a wireless multiple-in-multiple-out (MIMO) communication system 100, which includes a first transceiver 102 with $M_T$ transmit ($T_x$) antennas 104 and a second transceiver 106 with $M_R$ receive ($R_x$) antennas 108, forming an $M_R \times M_T$ MIMO system. For the description below, the first transceiver 102 is designated as a "transmitter" because the transceiver 102 predominantly transmits signals to the transceiver 106, which predominantly receives signals and is designated as a "receiver". Despite the designations, both "transmitter" 102 and "receiver" 106 may transmit and receive data.

The transmitter 102 and receiver 106 may be part of a MIMO-OFDM (Orthogonal Frequency Division Multiplexing) system. The IEEE 802.11a standard describes one type of OFDM system and the protocols used by such a system. In an OFDM system, a data stream is split into multiple substreams, each of which is sent over a subcarrier frequency (also referred to as a "tone"). In an embodiment, the transmitter 102 and receiver 106 may be implemented in a WLAN (wireless Local Area Network). It is also contemplated that such transceivers may be implemented in other types of wireless communication devices or systems, such as mobile phones, laptops, personal digital assistants (PDAs), and base stations.

The antenna in the transmitter 102 and receiver 106 communicate over channels in a wireless medium. In FIG. 1, H represents the reflections and multi-paths in the wireless medium, which may affect the quality of the channels.

Figure 2:
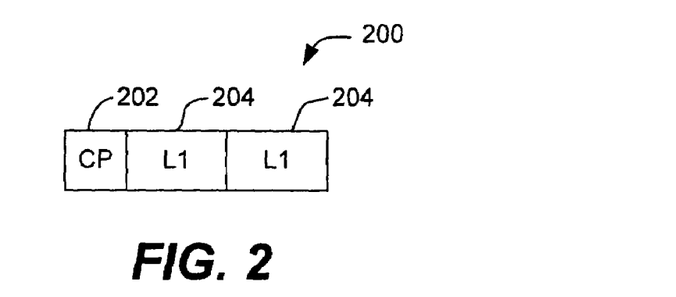
FIG. 2 is a preamble structure for a single-in-single-out (SISO) communication system.

In MIMO-OFDM systems, channel estimation may be used to estimate wireless channel gain and phase on each tone of the MIMO-OFDM system. FIG. 2 shows a preamble structure 200 for an exemplary OFDM system, e.g., an IEEE 802.11a WLAN (Wireless LAN). The transmitter 102 transmits a cyclic prefix (CP) 202 followed by two identical training symbols 204 (designated "L1") to the receiver 106.

The training symbols 204 contain known data on each of the tones to aid in estimation at the receiver. For example, in an IEEE 802.11a system, a BPSK (binary phase shift keying) signal is sent on each of the 52 tones (designated −26 to 26 with the DC (zero) tone omitted). The receiver uses the known values to estimate the medium characteristics on each of the frequency tones used for data transmission. There may be a frequency offset in the channel which may introduce interference among the various carriers in the OFDM signal. The training symbol L1 is repeated to aid in determining the fine frequency adjustment for such a frequency offset.

Figure 3:
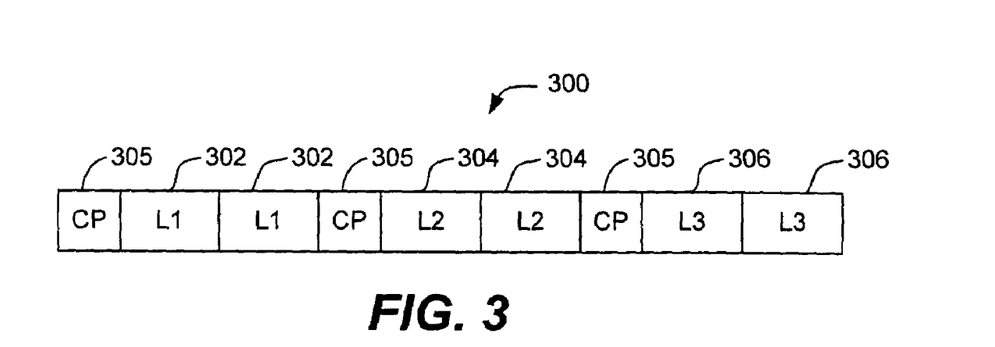
FIG. 3 shows a preamble structure for a 3×3 MIMO system.

The preamble structure 200 shown in FIG. 2 may be suitable where only one channel needs to be estimated, e.g., for a SISO system. However, in a MIMO system, channels between all pairs of transmit ($T_x$) and receiver ($R_x$) antennas should be estimated. FIG. 3 shows a preamble structure 300 for a 3×3 MIMO system according to an embodiment. The preamble structure includes three training symbols, designated "L1" 302, "L2" 304, and "L3" 306 (one for each $T_x$-$R_x$ antenna pair). Each of these training symbols may be repeated to aid in determining the fine frequency adjustment. Each training symbol pair may be preceded by a cyclic prefix. In an N×N MIMO system, the preamble structure may include N training symbols (L1, L2, . . . , LN).

Figure 4:
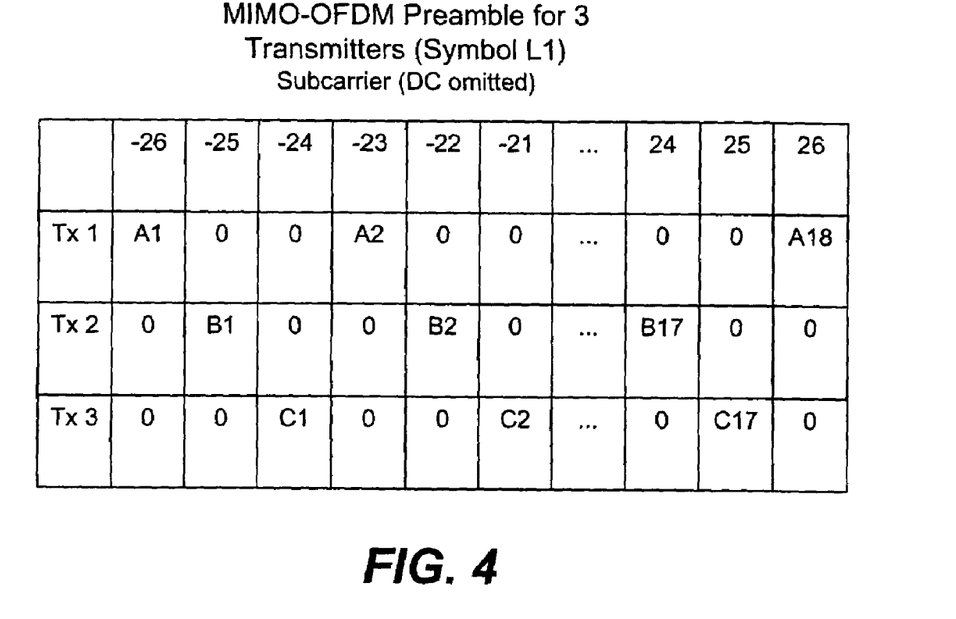
FIG. 4 shows a training symbol structure for a first training symbol.
Figure 5:
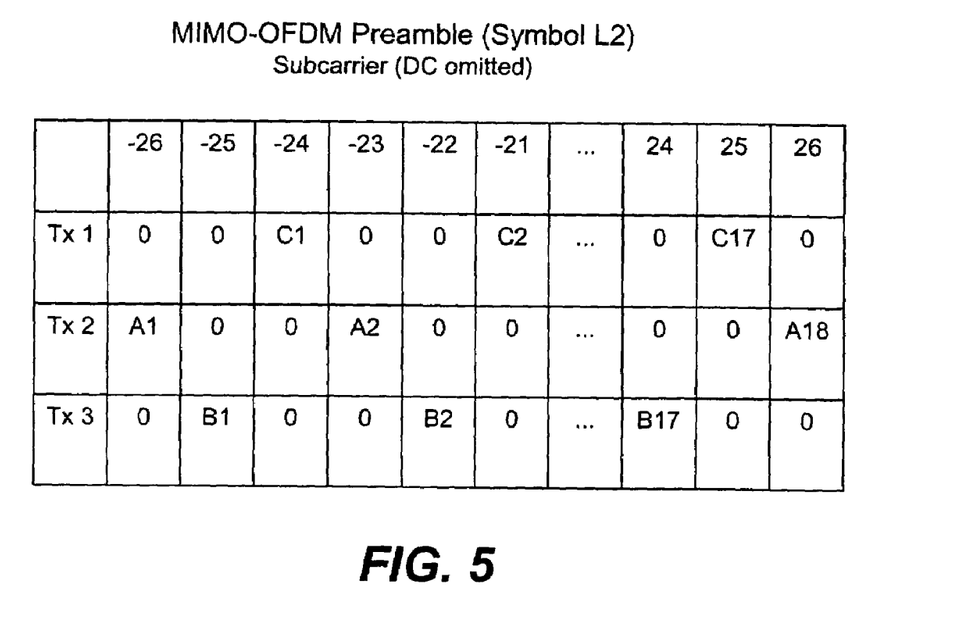
FIG. 5 shows a training symbol structure for a second training symbol.
Figure 6:
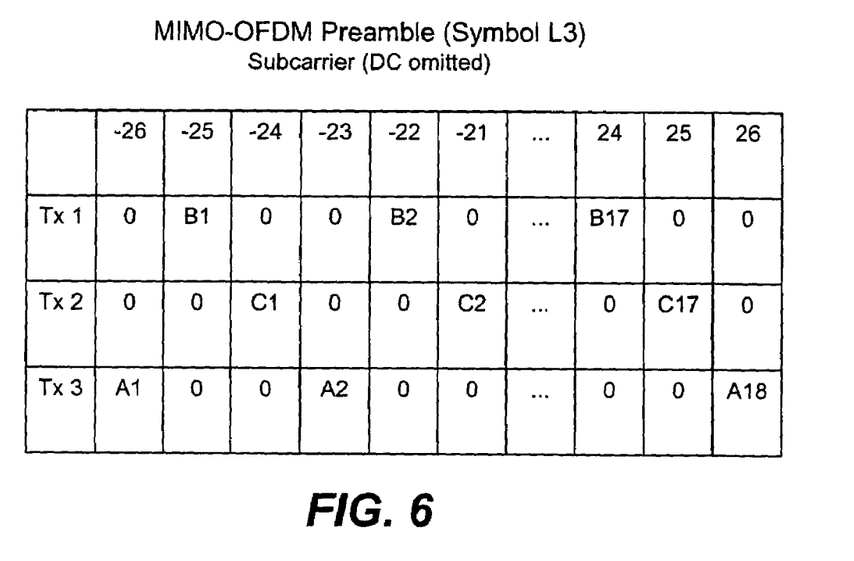
FIG. 6 shows a training symbol structure for a third training symbol.

In an embodiment, the training symbols L1, L2, L3 have a cyclic transmission pattern as shown in FIGS. 4, 5, and 6, respectively. The transmitter may include a $T_x$ training module 120 (FIG. 1) that generates training symbols and prepares the symbols for transmission. Referring to FIG. 4, transmit antenna $T_{x1}$ transmits eighteen "A" symbols (A1 . . . A18). An A symbol is transmitted on every third tone, beginning at tone −6, and a null (zero) value on the intervening tones. Likewise, transmit antenna $T_{x2}$ transmits seventeen "B" symbols (B1 . . . B17) on every third tone, beginning at tone −25, and a null value on the intervening tones, and transmit antenna $T_{x3}$ transmits seventeen "C" symbols (C1 . . . C17) on every third tone, beginning at tone −24, and a null value on the intervening tones. To provide for even power distribution, each of the "A" symbols may have a magnitude of $$\sqrt{\frac{52}{18}}$$

(since they constitute eighteen of the fifty-two tones), and each of the "B" and "C" symbols may have a magnitude of $$\sqrt{\frac{52}{17}}$$

(since they each constitute seventeen of the fifty-two tones).

The receiver 106 may include an $R_x$ training module 130 (FIG. 1) that processes received training symbols. The receiver may receive the signals from all of the transmit antennas and the $R_x$ training module may divide out the corresponding symbol (A, B, or C) to determine the gain at the transmitting antenna for that tone. For example, when receiving symbol L1, the receiver may divide out symbol A1 for tone "−26" to determine the gain at $T_{x1}$ for tone "−26".

As shown in FIGS. 5 and 6, the training symbols L2 and L3 have a similar transmission pattern, but with a cyclic shift between patterns, such that after all of the training symbols have been sent, the "A", "B", and "C" symbols sequences have been transmitted on all of the transmit ($T_x$) antennas. The receiver 106 may then use this information to determine the gain at each transmit antenna for each tone. For example, the receiver may combine all of the tones horizontally for each transmit antenna and then take an inverse Fourier transform (IFT) to get the actual time domain waveform that is sent through the respective antenna.

In this embodiment, all of the antennas are on simultaneously in the time domain, but only one is on the frequency domain for purposes of channel estimation. This may be done to simplify automatic gain control (AGC) requirements at the receiver 106. In this manner, every symbol period can have all transmit antennas transmitting such that the received power does not vary substantially between L1, L2, and L3. Consequently, no adjustment of receiver AGC between training symbols may be necessary, and the AGC can be set before symbol L1 and held at a constant value for L2 and L3 and still provide an acceptable dynamic range at the receiver. This may be preferable to sending a preamble over each of the transmitters in turn (i.e., one antenna transmitting and the others not transmitting) because the dynamic range may change between antenna transmission periods. Furthermore, the embodiment described here avoids changing the transmit power for each antenna during preambles and during data symbols.

Figure 7A:
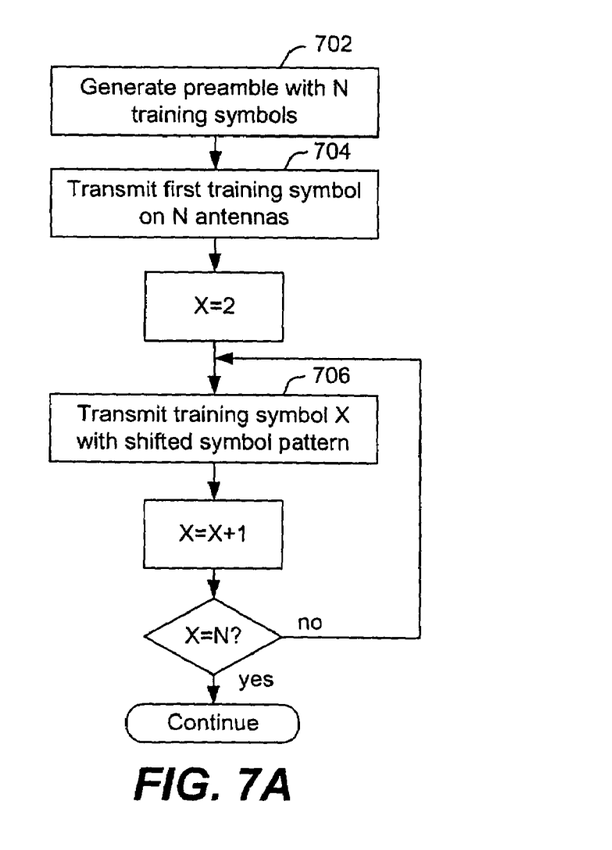
FIG. 7A is a flowchart describing a training operation at a transmitter.
Figure 7B:
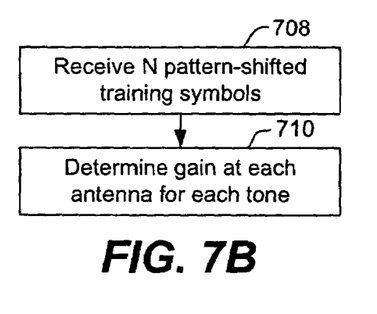
FIG. 7B is a flowchart describing a training operation at a receiver.

FIGS. 7A and 7B are flowcharts describing training operations performed at the transmitter 102 and receiver 106, respectively. The $T_x$ training module 120 generates a preamble with N training symbols (block 702). The transmitter transmits the preamble on N transmit antennas (block 704). The transmitter transmits a first training symbol simultaneously on all N antennas (block 702). The transmitter then transmits the remaining N−1 training symbols in sequence (block 706), with each training symbol having a pattern shifted from that of the previously sent training symbol. The receiver receives the pattern-shifted training symbols such that each symbol sequence (e.g., A1 . . . A18, B1 . . . B17, C1 . . . C17) has been received from each of the transmit antennas 104 (block 708). The $R_x$ training module 130 may then use this information to determine the gain at each transmit antenna for each tone (block 710).

For a given transmit power, this technique may provide a boost in training power for each subcarrier relative to data transmission, since only one antenna transmits on each subcarrier and in each training symbol. For a given training symbol, all available power can be reserved for a given data symbol for each tone, effectively increasing power by a factor of three (for a 3×3 MIMO) to estimate the channel. For example, in training symbol L1 (FIG. 4), all available power can be reserved for symbol B1 in tone "−25".

Figure 8:
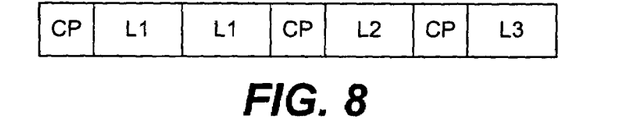
FIG. 8 is an alternative preamble structure for a 3×3 MIMO system.

The repetition of training symbols allows estimation of carrier frequency offsets and for additional processing gain for channel estimation. In many situations, the frequency offset will not change significantly between channels. In these situations, the training symbols after L1 (i.e., L2 and L3) may not be repeated, as shown in FIG. 8, and the frequency offset may be determined from the repeated L1 training symbols.

The interleaved pattern shown in FIGS. 4-6 (i.e., with null symbols intervening the "A", "B", and "C" symbols) may be advantageous in mediums with low channel delay spreads. "Channel delay spread" refers to the spread in delays between different echoes, e.g., the dominant path (e.g., line-of-sight) and secondary paths. For example, for a channel with a line-of-sight transmission path, there may be few echoes. In this case, the channel response at each of the tones in the training symbol L1 at the receiver 106 may be similar.

Figure 7C:
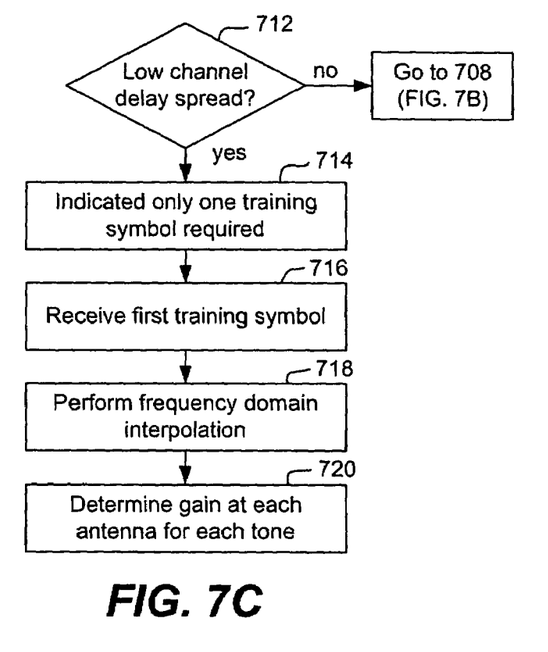
FIG. 7C is a flowchart describing an alternative training operation at a receiver.

As shown in FIG. 7C, for channels the receiver determines to have a low delay spread (block 712), the receiver may indicate to the transmitter that only one training symbol is required (block 714). The receiver may receive the first training symbol (block 716), and the $R_x$ training module 130 may perform a frequency domain interpolation (block 718), i.e., interpolate the zero values between adjacent "A", "B", and "C" symbols, to determine the gain at each antenna for each tone (block 720). In this case, the transmitter may send fewer training symbols, e.g., only L1, thereby reducing the training overhead.

Figure 9:
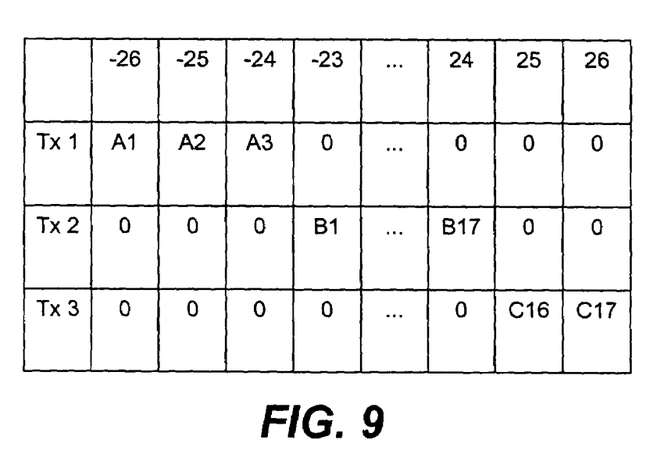
FIG. 9 is an alternative training symbol structure.

In alternative embodiments, the transmission pattern may be modified by grouping the staggered symbols, e.g., in groups, as shown in FIG. 9. However, this training symbol structure may preclude the optional frequency domain interpolation described above in reference to FIG. 7C.

Although IEEE 802.11 systems have been described, the techniques may be used in other OFDM system, such as IEEE 802.16 systems.

As will be appreciated, the processes and techniques described herein can be implemented, at least in part, using a memory. A memory can store data such as a preamble structure. Moreover, a memory can contain a computer program that causes one or more wireless communication devices to perform the operations described.

A number of embodiments have been described. Nevertheless, it will be understood that various modifications may be made without departing from the spirit and scope of the invention. For example, blocks in the flowchart may be skipped or performed out of order and still produce desirable results. Accordingly, other embodiments are within the scope of the following claims.

The invention claimed is:

1. A method comprising:
  generating a first training symbol,
  wherein the first training symbol comprises a plurality of data symbols,
  wherein each of the plurality of data symbols corresponds to different ones of a plurality of tones; and
  operating a transmitter to transmit the first training symbol on a plurality of antennas, wherein each of the plurality of antennas transmits a corresponding one of the plurality of data symbols.

2. The method of claim 1, further comprising:
  transmitting a second training symbol on the plurality of antennas,
  wherein the second training symbol comprises the plurality of data symbols in the first training symbol, and
  wherein each of the plurality of antennas transmits a different one of the plurality of data symbols than in the first training symbol.

3. The method of claim 2, wherein the first training symbol has a first pattern in which each of the plurality of antennas transmits one of the plurality of data symbols on a first subset of tones, and
  wherein the second training symbol has a second pattern comprising a shifted pattern of the first pattern such that each of the plurality of antennas transmits a respective data symbol on a different subset of tones.

4. The method of claim 1, wherein the plurality of antennas comprises N antennas, and further comprising transmitting N-1 training symbols after the first training symbol.

5. The method of claim 4, further comprising: transmitting each of said training symbols at least two times.

6. The method of claim 1, further comprising: transmitting the first training symbol at least two times.

7. The method of claim 1, wherein the plurality of data symbols in the first training symbol are transmitted simultaneously on the plurality of antennas.

8. The method of claim 1, wherein each of the plurality of antennas transmits said corresponding ones of the plurality of data symbols on corresponding ones of the plurality of tones and transmits null symbols on the other tones.

9. The method of claim 1, wherein the first training symbol comprises an OFDM (Orthogonal Frequency Division Multiplexing) training symbol.

10. A method comprising:
  receiving, in a receiver, a first training symbol transmitted by a plurality of antennas,
  wherein the first training symbol comprises a plurality of data symbols,
  wherein each of the plurality of data symbols corresponds to different ones of a plurality of tones, and
  wherein each of the plurality of data symbols is received from a corresponding one of the plurality of antennas; and
  in response to at least the first training symbol, determining a gain at each of the plurality of antennas for each of the plurality of tones.

11. The method of claim 10, wherein said determining comprises:
  for each of the plurality of antennas, interpolating values for a plurality of said tones from the corresponding plurality of data symbols received from said antennas.

12. The method of claim 10, wherein said plurality of antennas comprises N antennas, and
  further comprising:
  receiving N-1 training symbols after the first training symbol.

13. The method of claim 12, wherein each of the first and N-1 training symbols comprises the plurality of data symbols, and
  wherein each of said training symbols has a corresponding pattern in which a different plurality of data symbols is transmitted on each of said plurality of antennas than in the other training symbols.

14. The method of claim 13, further comprising:
  receiving each of the plurality of data symbols from each of the plurality of antennas.

15. The method of claim 14, wherein said determining comprises:
  performing an inverse Fourier transform on the plurality of data symbols received from each of the plurality of antenna.

16. A memory that stores data comprising:
  a preamble structure comprising a first training symbol comprising a plurality of data symbols,
  wherein each of the plurality of data symbols corresponds to different ones of a plurality of tones, and
  wherein each of the plurality of data symbols is designated to be transmitted by a corresponding one of a plurality of antennas.

17. The memory of claim 16, wherein said plurality of antennas comprises N antennas, and wherein the preamble structure further comprises:
   N−1 training symbols in addition to the first training symbol,
   wherein each of said training symbols comprises the plurality of data symbols, and
   wherein each of said training symbols has a corresponding pattern in which each of the plurality of antennas transmits one of the plurality of data symbols over a different subset of tones than in the other training symbols.

18. The memory of claim 17, wherein the preamble structure comprises a preamble structure for an N×N multiple-in-multiple-out (MIMO) system.

19. The memory of claim 16, wherein the training symbols comprise Orthogonal Frequency Division Multiplexing (OFDM) training symbols.

20. An apparatus comprising:
   a training module operative to transmit a first training symbol on a plurality of antennas,
   wherein the first training symbol comprises a plurality of data symbols,
   wherein each of the plurality of data symbols corresponds to different ones of a plurality of tones, and
   wherein each of the plurality of antennas transmits a corresponding one of the plurality of data symbols.

21. The apparatus of claim 20, wherein the training module is further operative to transmit a second training symbol on the plurality of antennas,
   wherein the second training symbol comprises the plurality of data symbols in the first training symbol, and
   wherein each of the plurality of antennas transmits a different one of the plurality of data symbols than in the first training symbol.

22. The apparatus of claim 21, wherein the first training symbol has a first pattern in which each of the plurality of antennas transmits one of the plurality of data symbols on a first subset of tones, and
   wherein the second training symbol has a second pattern comprising a shifted pattern of the first pattern such that each of the plurality of antennas transmits a respective data symbol on a different subset of tones.

23. The apparatus of claim 20, wherein the plurality of antennas comprises N antennas, and wherein the training module is further operative to transmit N−1 training symbols after the first training symbol.

24. The apparatus of claim 23, wherein the training module is further operative to transmit each of said training symbols at least two times.

25. The apparatus of claim 20, wherein the training module is further operative to transmit the first training symbol at least two times.

26. The apparatus of claim 20, wherein the training module is further operative to transmit the plurality of data symbols in the first training symbol simultaneously on the plurality of antennas.

27. The apparatus of claim 20, wherein for each of the plurality of antennas, the training module is further operative to transmit said corresponding ones of the plurality of data symbols on corresponding ones of the plurality of tones and transmit null symbols on the other tones.

28. The apparatus of claim 20, wherein the first training symbol comprises an OFDM (Orthogonal Frequency Division Multiplexing) training symbol.

29. An apparatus comprising:
   a training module operative to receive a first training symbol transmitted by a plurality of antennas,
   wherein the first training symbol comprises a plurality of data symbols,
   wherein each of the plurality of data symbols corresponds to different ones of a plurality of tones, and
   wherein each of the plurality of data symbols is received from a corresponding one of the plurality of antennas; and
   in response to at least the first training symbol, determine a gain at each of the plurality of antennas for each of the plurality of tones.

30. The apparatus of claim 29, wherein for each of the plurality of antennas, the training module is operative to interpolate values for a plurality of said tones from the corresponding plurality of data symbols received from said antenna.

31. The apparatus of claim 29, wherein said plurality of antennas comprises N antennas, and
   wherein the training module is further operative to receive N−1 training symbols after the first training symbol.

32. The apparatus of claim 31, wherein each of the first and N−1 training symbols comprises the plurality of data symbols, and
   wherein each of said training symbols has a corresponding pattern in which each of the plurality of antennas transmits one of the plurality of data symbols over a different subset of tones than in the other training symbols.

33. The apparatus of claim 32, wherein the training module is further operative to receive each of the plurality of data symbols from each of the plurality of antennas.

34. The apparatus of claim 33, wherein the training module is further operative to perform an inverse Fourier transform on the plurality of data symbols received from each of the plurality of antenna.

35. An apparatus comprising:
   means for transmitting a first training symbol on a plurality of antennas; and
   means for generating the first training symbol, wherein the first training symbol comprises a plurality of data symbols,
   wherein each of the plurality of data symbols corresponds to different ones of a plurality of tones, and
   wherein each of the plurality of antennas transmits a corresponding one of the plurality of data symbols.

36. The apparatus of claim 35, further comprising:
   means for transmitting a second training symbol on the plurality of antennas,
   wherein the second training symbol comprises the plurality of data symbols in the first training symbol, and
   wherein each of the plurality of antennas transmits a different one of the plurality of data symbols than in the first training symbol.

37. The apparatus of claim 36, wherein the first training symbol has a first pattern in which each of the plurality of antennas transmits one of the plurality of data symbols on a first subset of tones, and
   wherein the second training symbol has a second pattern comprising a shifted pattern of the first pattern such that each of the plurality of antennas transmits a respective data symbol on a different subset of tones.

38. The apparatus of claim 35, wherein the plurality of antennas comprises N antennas, and further comprising transmitting N−1 training symbols after the first training symbol.

39. The apparatus of claim 38, further comprising: means for transmitting each of said training symbols at least two times.

40. The apparatus of claim 35, further comprising: means for transmitting the first training symbol at least two times.

41. The apparatus of claim 35, wherein the plurality of data symbols in the first training symbol are transmitted simultaneously on the plurality of antennas.

42. The apparatus of claim 35, wherein each of the plurality of antennas transmits said corresponding ones of the plurality of data symbols on corresponding ones of the plurality of tones and transmits null symbols on the other tones.

43. The apparatus of claim 35, wherein the first training symbol comprises an OFDM (Orthogonal Frequency Division Multiplexing) training symbol.

44. A apparatus comprising:
means for receiving a first training symbol transmitted by a plurality of antennas,
wherein the first training symbol comprises a plurality of data symbols,
wherein each of the plurality of data symbols corresponds to different ones of a plurality of tones, and
wherein each of the plurality of data symbols is received from a corresponding one of the plurality of antennas; and
means for determining a gain at each of the plurality of antennas for each of the plurality of tones in response to at least the first training symbol.

45. The apparatus of claim 44, wherein said means for determining comprises:
means for interpolating values for a plurality of said tones from the corresponding plurality of data symbols received from said antenna for each of the plurality of antennas.

46. The apparatus of claim 44, wherein said plurality of antennas comprises N antennas, and
further comprising:
means for receiving N−1 training symbols after the first training symbol.

47. The apparatus of claim 46, wherein each of the first and N−1 training symbols comprises the plurality of data symbols, and
wherein each of said training symbols has a corresponding pattern in which each of the plurality of antennas transmits one of the plurality of data symbols over a different subset of tones than in the other training symbols.

48. The apparatus of claim 47, further comprising:
means for receiving each of the plurality of data symbols from each of the plurality of antennas.

49. The apparatus of claim 48, wherein said means for determining comprises:
means for performing an inverse Fourier transform on the plurality of data symbols received from each of the plurality of antennas.

50. A computer readable memory containing a program that causes one or more wireless communication devices to perform operations comprising:
transmitting a first training symbol on a plurality of antennas,
wherein the first training symbol comprises a plurality of data symbols,
wherein each of the plurality of data symbols corresponds to different ones of a plurality of tones, and
wherein each of the plurality of antennas transmits a corresponding one of the plurality of data symbols.

51. The computer readable memory of claim 50, further comprising:
transmitting a second training symbol on the plurality of antennas,
wherein the second training symbol comprises the plurality of data symbols in the first training symbol, and
wherein each of the plurality of antennas transmits a different one of the plurality of data symbols than in the first training symbol.

52. The computer readable memory of claim 51, wherein the first training symbol has a first pattern in which each of the plurality of antennas transmits one of the plurality of data symbols on a first subset of tones, and
wherein the second training symbol has a second pattern comprising a shifted pattern of the first pattern such that each of the plurality of antennas transmits a respective data symbol on a different subset of tones.

53. The computer readable memory of claim 50, wherein the plurality of antennas comprises N antennas, and further comprising transmitting N−1 training symbols after the first training symbol.

54. The computer readable memory of claim 53, further comprising:
transmitting each of said training symbols at least two times.

55. The computer readable memory of claim 50, further comprising:
transmitting the first training symbol at least two times.

56. The computer readable memory of claim 50, wherein the plurality of data symbols in the first training symbol are transmitted simultaneously on the plurality of antennas.

57. The computer readable memory of claim 50, wherein each of the plurality of antennas transmits said corresponding ones of the plurality of data symbols on corresponding ones of the plurality of tones and transmits null symbols on the other tones.

58. The computer readable memory of claim 50, wherein the first training symbol comprises an OFDM (Orthogonal Frequency Division Multiplexing) training symbol.

59. A computer readable memory containing a program that causes one or more wireless communication devices to perform operations comprising:
receiving a first training symbol transmitted by a plurality of antennas,
wherein the first training symbol comprises a plurality of data symbols,
wherein each of the plurality of data symbols corresponds to different ones of a plurality of tones, and
wherein each of a plurality of subsets of the plurality of data symbols is received from a corresponding one of the plurality of antennas; and
in response to at least the first training symbol, determining a gain at each of the plurality of antennas for each of the plurality of tones.

60. The computer readable memory of claim 59, wherein said determining comprises:
for each of the plurality of antennas, interpolating values for a plurality of said tones from the corresponding plurality of data symbols received from said antenna.

61. The computer readable memory of claim 59, wherein said plurality of antennas comprises N antennas, and further comprising:
receiving N−1 training symbols after the first training symbol.

62. The computer readable memory of claim 61, wherein each of the first and N−1 training symbols comprises the plurality of data symbols, and
wherein each of said training symbols has a corresponding pattern in which each of the plurality of antennas transmits one of the plurality of data symbols over a different subset of tones than in the other training symbols.

63. The computer readable memory of claim 62, further comprising:
receiving each of the plurality of data symbols from each of the plurality of antennas.

64. The computer readable memory of claim 63, wherein said determining comprises:
performing an inverse Fourier transform on the plurality of data symbols received from each of the plurality of antennas.

65. A system comprising:
a first transceiver comprising
a first plurality of antennas, and
a transmit training module operative to transmit a first training symbol on the first plurality of antennas,
wherein the first training symbol comprises a plurality of data symbols,
wherein each of the plurality of data symbols corresponds to different ones of a plurality of tones, and
wherein each of the first plurality of antennas transmits a corresponding one of the plurality of data symbols; and
a second transceiver comprising
a second plurality of antennas, and
a receive training module operative to receive the first training symbol and to determine a gain at each of the first plurality of antennas for each of the plurality of tones in response to at least the first training symbol.

66. The system of claim 65, wherein the transmit training module is further operative to transmit a second training symbol on the first plurality of antennas,
wherein the second training symbol comprises the plurality of data symbols in the first training symbol, and
wherein each of the plurality of first antennas transmits a different one of the plurality of data symbols than in the first training symbol.

67. The system of claim 66, wherein the first training symbol has a first pattern in which each of the first plurality of antennas transmits one of the plurality of data symbols on a first subset of tones, and
wherein the second training symbol has a second pattern comprising a shifted pattern of the first pattern such that each of the first plurality of antennas transmits a respective data symbol on a different subset of tones.

68. The system of claim 65, wherein the plurality of antennas comprise N antennas, and wherein the transmit training module is further operative to transmit N−1 training symbols after the first training symbol.

69. The system of claim 68, wherein each of the first and N−1 training symbols comprises the plurality of data symbols, and
wherein each of said training symbols has a corresponding pattern in which each of the plurality of antennas transmits one of the plurality of data symbols over a different subset of tones than in the other training symbols.

70. The system of claim 69, wherein the receive training module is further operative to receive each of the plurality of data symbols from each of the plurality of antennas.

71. The system of claim 70, wherein the receive training module is further operative to perform an inverse Fourier transform on the plurality of data symbols received from each of the plurality of antennas.

72. The system of claim 65, wherein the system comprises an N×N multiple-in-multiple-out (MIMO) system.

73. The system of claim 65, wherein the first training symbol comprises an OFDM (Orthogonal Frequency Division Multiplexing) training symbol.

74. A system comprising:
a first transceiver comprising
a first plurality of antennas, and
means for transmitting a first training symbol on the first plurality of antennas,
wherein the first training symbol comprises a plurality of data symbols,
wherein each of the plurality of data symbols corresponds to different ones of a plurality of tones, and
wherein each of the first plurality of antennas transmits a corresponding one of the plurality of data symbols; and
a second transceiver comprising
a second plurality of antennas,
means for receiving the first training symbol, and
means for determining a gain at each of the first plurality of antennas for each of the plurality of tones in response to at least the first training symbol.

75. The system of claim 74, wherein the first transceiver further comprises means for transmitting a second training symbol on the first plurality of antennas,
wherein the second training symbol comprises the plurality of data symbols in the first training symbol, and
wherein each of the plurality of first antennas transmits a different one of the plurality of data symbols than in the first training symbol.

76. The system of claim 75, wherein the first training symbol has a first pattern in which each of the first plurality of antennas transmits one of the plurality of data symbols on a first subset of tones, and
wherein the second training symbol has a second pattern comprising a shifted pattern of the first pattern such that each of the first plurality of antennas transmits a respective data symbol on a different subset of tones.

77. The system of claim 74, wherein the plurality antennas comprise N antennas, and wherein the first transceiver further comprises means for transmitting N−1 training symbols after the first training symbol.

78. The system of claim 77, wherein each of the first and N−1 training symbols comprises the plurality of data symbols, and
wherein each of said training symbols has a corresponding pattern in which each of the plurality of antennas transmits one of the plurality of data symbols over a different subset of tones than in the other training symbols.

79. The system of claim 78, wherein the second transceiver further comprises means for receiving each of the plurality of data symbols from each of the plurality antennas.

80. The system of claim 79, wherein the second transceiver further comprises means for performing an inverse Fourier transform on the plurality of data symbols received from each of the plurality of antennas.

81. The system of claim 74, wherein the system comprises an N×N multiple-in-multiple-out (MIMO) system.

82. The system of claim 74, wherein the first training symbol comprises an OFDM (Orthogonal Frequency Division Multiplexing) training symbol.

* * * * *